United States Patent
Hohl et al.

(10) Patent No.: US 9,111,434 B2
(45) Date of Patent: Aug. 18, 2015

(54) SYSTEM AND METHOD FOR MONITORING THE PRESENCE OF A PERSON IN A MONITORED AREA

(71) Applicant: Sony Corporation, Tokyo (JP)

(72) Inventors: Fritz Hohl, Stuttgart (DE); Ralf Boehnke, Esslingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/621,479

(22) Filed: Feb. 13, 2015

(65) Prior Publication Data

US 2015/0161869 A1   Jun. 11, 2015

Related U.S. Application Data

(63) Continuation of application No. 13/088,879, filed on Apr. 18, 2011, now abandoned.

(30) Foreign Application Priority Data

May 14, 2010   (EP) ..................................... 10162828

(51) Int. Cl.
*G01J 5/02* (2006.01)
*G08B 21/04* (2006.01)
*G08B 21/22* (2006.01)
*G01J 5/10* (2006.01)
*G01J 5/00* (2006.01)

(52) U.S. Cl.
CPC ............... *G08B 21/0469* (2013.01); *G01J 5/10* (2013.01); *G08B 21/22* (2013.01); *G01J 2005/0077* (2013.01)

(58) Field of Classification Search
CPC ............................ G01J 2005/0077; G01J 5/10
See application file for complete search history.

(56) References Cited

U.S. PATENT DOCUMENTS

| | | | |
|---|---|---|---|
| 4,675,659 A | 6/1987 | Jenkins et al. |
| 4,947,152 A | 8/1990 | Hodges |
| 5,473,368 A | 12/1995 | Hart |
| 6,044,632 A | 4/2000 | Schmalz et al. |
| 6,049,281 A | 4/2000 | Osterweil |

(Continued)

FOREIGN PATENT DOCUMENTS

CN   1937955 A   3/2007

OTHER PUBLICATIONS

Jeffrey A. Nanzer, "Applying Millimeter-Wave Correlation Radiometry to the Detection of Self-Luminous Objects at Close Range", Microwave Theory and Techniques, IEEE Transactions, vol. 56 Issue: 9, Aug. 15, 2008, pp. 2054-2061.

(Continued)

*Primary Examiner* — Christine Sung
(74) *Attorney, Agent, or Firm* — Oblon, McClelland, Maier & Neustadt, L.L.P.

(57) ABSTRACT

A system and a corresponding method for monitoring the presence of a person in a monitored area, includes a passive radiometer that detects radiation emitted from a predetermined monitored area in a predetermined frequency range between 1 GHz and 100 THz and that generates a radiation signal from the detected radiation, a radiation signal processor that processes the radiation signal and that generates, based on the processed radiation signal, a monitoring signal indicating the presence or absence of a person in the monitored area, and an application controller that controls an application based on the monitoring signal.

18 Claims, 3 Drawing Sheets

(56) References Cited

U.S. PATENT DOCUMENTS

| | | | |
|---|---|---|---|
| 6,384,414 | B1 | 5/2002 | Fisher et al. |
| 6,462,663 | B1 | 10/2002 | Wilson et al. |
| 7,110,569 | B2 | 9/2006 | Brodsky et al. |
| 7,126,477 | B2 | 10/2006 | Gallivan et al. |
| 7,629,890 | B2 | 12/2009 | Sullivan et al. |
| 8,340,834 | B1 | 12/2012 | Walma et al. |
| 8,620,625 | B2 | 12/2013 | Sing et al. |
| 2007/0030115 | A1 | 2/2007 | Itsuji et al. |
| 2007/0121103 | A1 | 5/2007 | Salmon |
| 2010/0039269 | A1 | 2/2010 | Newham |

OTHER PUBLICATIONS

EC International, "iMONITOR", http://www.myangelmonitor.com/product.html, Aug. 2009, 2 pages.

Smart Caregiver Corporation, "Bed and Chair Fall Monitoring Systems", http://www.smartcaregivercorp.com/FallPressurePads.htm, Aug. 2010, 5 pages.

Smart Caregiver Corporation, "Anti-Wandering Optical Beam Sensor", http://www.antiwandering.com/antiopticalbeams.htm, 2010, 1 page.

EMFIT, "SAFEBED Bed-Exit-Alarm", http://www.emfit.com, Aug. 2010, 2 pages.

Wespot, "SecNurse Intelligent Care Sensor", http://www.secumatic.nl, Jun. 2007, 2 pages.

Combined Chinese Office Action and Search Report issued May 5, 2014 in Patent Application No. 201110129964.2 (with English Translation of Categories of Cited Documents).

Nanzer et al., A Ka-band Correlation Radiometer for Human Presence Detection from a Moving platform, IEEE, pp. 385-388.

Salmon et al., Digital Beam-Forming for Passive Millimetre Wave Security Imaging, Nov. 2007, The Second European conference on Antennas and Propagation, pp. 1-11.

SYSTEM AND METHOD FOR MONITORING THE PRESENCE OF A PERSON IN A MONITORED AREA

CROSS-REFERENCE TO RELATED APPLICATIONS

The present application is a continuation of U.S. application Ser. No. 13/088,879 filed Apr. 18, 2011, which claims priority of European patent application 10162828.7 filed on May 14, 2010. The entire contents of both of which are incorporated herein by reference.

FIELD OF THE INVENTION

The present invention relates to a system for monitoring the presence of a person in a monitored area. Further, the present invention relates to a corresponding method and to a computer readable non-transitory medium for storing such a computer program.

BACKGROUND OF THE INVENTION

There are applications where it would be useful to detect whether a person is inside or outside a certain (monitored) area (e.g. in a bed). Such applications, for instance, include:

Patients that are or should be immobile are expected to be in the bed. Every out-of-bed event is considered to be a potential emergency (e.g. the patient might have fallen out of the bed) that requires some personnel to check whether everything is ok.

Dementia-affected persons or smaller children might not be able to orientate themselves when going out-of-bed during the night so it might be desirable that some responsible person is informed as soon as this happens.

Children might need light in order to fall asleep. When in bed, the light should be switched off after some time (advantageously, after the child had fallen asleep). When the child leaves the bed the light should be switched on again in order to allow the child to fight its fears, and then the cycle of switching off the light again should be restarted.

The above mentioned first and second applications are often subsumed under "fall and wandering prevention" or similar terms. All these applications have in common that a system should detect when someone was in a bed and then is not in the bed anymore. The applications primarily differ in what happens after the detection.

There are a number of products on the "fall and wandering prevention" market. Examples for such products are:

SafeBed (Emfit Ltd.)

This system works with pressure sensors underneath the mattress. As soon as there is a change in pressure (as a result from e.g. a person leaving the bed) an action such as informing medical personnel is initiated. The problem with this class of system is that:

a) The functionality depends upon a pressure sensor underneath a mattress. Therefore, there is a certain threshold value for pressure changes in order to distinguish relevant from irrelevant events (e.g. leaving the bed vs. moving in bed). This often leads to a minimum weight requirement of the person that shall be monitored.

b) As the sensors are in the bed, every bed needs to be equipped with the system.

SecNurse (Optex)

This system consists of a conventional camera with infrared illumination and some processing capabilities in order to detect image changes outside an area that have been defined as containing the bed. The problem with this type of systems is that it is difficult to distinguish relevant from irrelevant events. Any change in picture can lead to initiating the action e.g. pets moving across a room. Also, it is very difficult to find a person being in bed as e.g. blankets cover most parts of a person in this situation. In addition, the system performance depends on the light situation in the room.

In addition, there are several systems that employ motion sensors that monitor an area (e.g. one next to the bed). As soon as the sensor detects motion in the monitored area it initiates some action. The problem with this type of systems is that it is difficult to distinguish relevant from irrelevant events. Any detected motion can lead to initiating the action e.g. pets moving across a room. Also, it is impossible to see a person being in bed as only areas outside the bed can be monitored.

Apart from the "fall and wandering" market, there are other products/concepts that include a "person in bed detection" functionality. For instance, one class of systems aims at detecting breathing movements and/or heart beat of persons lying in bed. Often, these systems use some sort of radar functionality, e.g. at 2.4 GHz. If no breathing or heart beat can be detected, the person is either dead or left the monitored area. The problems of this class of systems are: a) The system uses active radiation that might be undesirable in a clinical environment or by the monitored person. b) "Being dead" or "having left a bed" are quite different causes for an event that could lead to either an underestimation of the severeness of a case or an overestimation, which is both undesirable.

BRIEF SUMMARY OF THE INVENTION

It is an object of the present invention to provide a system and a corresponding method for monitoring the presence of a person in a monitored area that overcome the above-mentioned problems and that allow a reliable detection of a person in the above-mentioned scenarios without requiring a large additional hard- or software overhead. It is a further object of the present invention to provide a computer program for controlling such a system and a computer readable non-transitory medium for storing such a computer program.

According to an aspect of the present invention there is provided a system for monitoring the presence of a person in a monitored area as defined in claim 1, comprising:

a passive radiometer that detects radiation emitted from a predetermined monitored area in a predetermined frequency range between 1 GHz and 100 THz and that generates a radiation signal from the detected radiation, a radiation signal processor that processes said radiation signal and that generates, based on said processed radiation signal, a monitoring signal indicating the presence or absence of a person in said monitored area, and an application controller that controls an application based on said monitoring signal.

According to a further aspect of the present invention there is provided a corresponding method.

According to a still further aspect there is provided a computer readable non-transitory medium having instructions stored thereon which, when carried out on a computer, control the system according to the present invention to perform the steps of a method according to the present invention.

Preferred embodiments of the invention are defined in the dependent claims. It shall be understood that the claimed method and the claimed computer readable medium have similar and/or identical preferred embodiments as the claimed system and as defined in the dependent claims.

The present invention is based on the idea to detect if a person is in the monitored area or outside of the monitored area using the technology of passive radiometric imaging, i.e. using a passive millimeter wave or micrometer wave radiometer (i.e. a radiometer had detects in the GHz- and THz-frequency range, in particular in the range from 30 GHz to 30 THz). Such passive radiometric detection does not require an illumination source for illuminating the monitored area (or the person within the monitored area), but simply detects the radiation that is self-emitted, e.g. by humans (or animals). Persons can even be detected if they are underneath a blanket and/or in their clothes. Further, the radiation signal generated from the detected radiation even allows to distinguish bodies of the size of humans from e.g. the size of pets, such as a cat or dog. It is also not required to equip a bed with such a system, but the necessary hardware can be, e.g. fixed or mobile, installed in a room, for instance in the sick room of a hospital or above the bed of a person at home. Even further, a reliable detection of the status of the presence of a person in the monitored area does also not depend on the weight or size of the person, as is the case for some of the above explained known systems. Compared to the known systems it is also expected that the system according to the present invention leads to less false "positives", i.e. monitoring signals that indicate the absence of a person from the monitored area although the person is actually within the monitored area.

According to the present invention, based on the monitoring signal which indicates if it has been detected that a person is present or absent in the monitored area, an application controller controls an application. In other words, dependent on the respective use of this system a certain application may be initiated, for instance if it has been detected that the person is no longer present in the monitored area, e.g. has fallen out of the bed. Such applications may, for instance, include to give an emergency alarm, ring a certain telephone number or pager, switch on light in the room etc.

According to a further aspect of the present invention there is provided a system for monitoring the presence of a person in a monitored area, comprising:

a passive radiometer means for detecting radiation emitted from a predetermined monitored area in a predetermined frequency range between 1 GHz and 100 THz and for generating a radiation signal from the detected radiation, a radiation signal processing means for processing said radiation signal and for generating, based on said processed radiation signal, a monitoring signal indicating the presence or absence of a person in said monitored area, and an application control means for controlling an application based on said monitoring signal.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
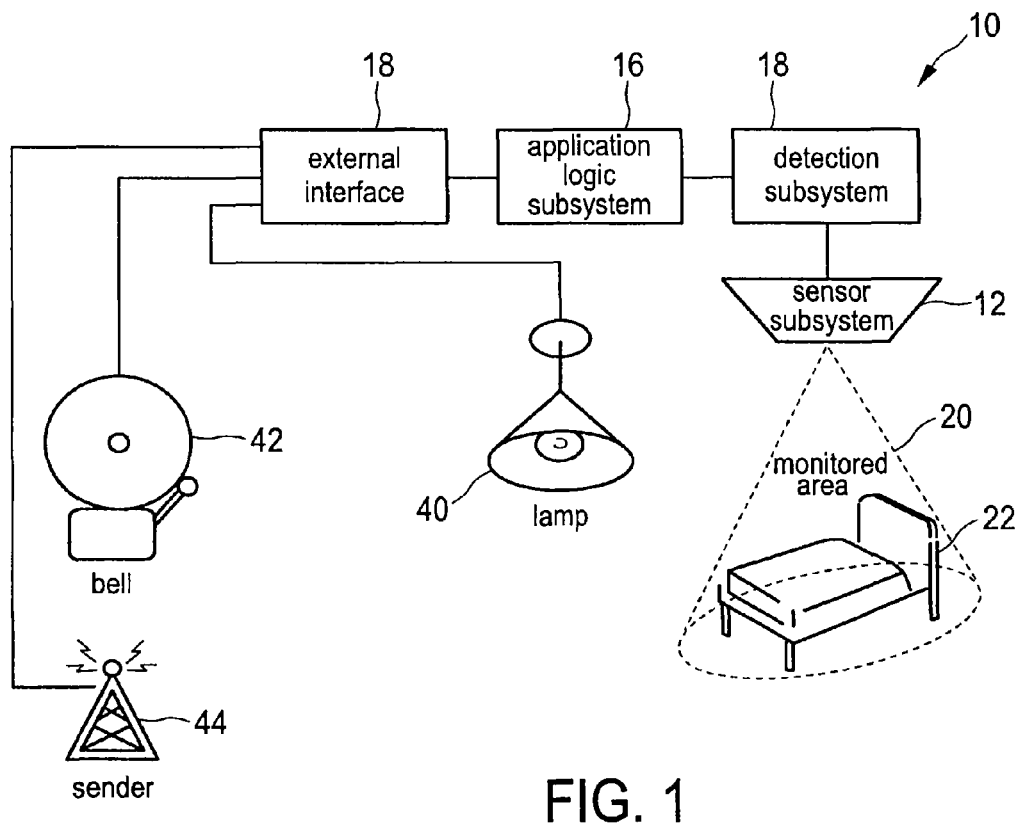
FIG. 1 shows a schematic diagram of a system according to the present invention.

FIG. 1 schematically shows a block diagram of a system 10 according to the present invention for monitoring the presence of a person (not shown) in a monitored area 20. Said system 10 comprises a sensor subsystem (also referred to as passive radiometer) 12, a detection subsystem (also referred to as radiation signal processor) 14, and an application logic subsystem (also referred to as application controller) 16. Preferably, an external interface 18 (also referred to as application interface) is provided. In this example here, the system is provided for monitoring if a person (e.g. a patient in sick room of a hospital) is present in the monitored area 20, in particular is lying in bed 22, or not, e.g. has fallen out of the bed 22.

The sensor subsystem (passive radiometer) 12 comprises a passive millimeter- (or micrometer-) wave (or Giga- or Tera-Hertz) sensor typically in frequency ranges from 30 GHz to 30 THz. It monitors the monitored area 20 by receiving radiation in the mm- (or μm-) wave (or Giga- or Tera-Hertz) range. Generally, the received radiation is converted by the sensor into a radiation signal indicating the amount of received radiation. The radiation signals are given to the detection subsystem 14.

Figure 2:
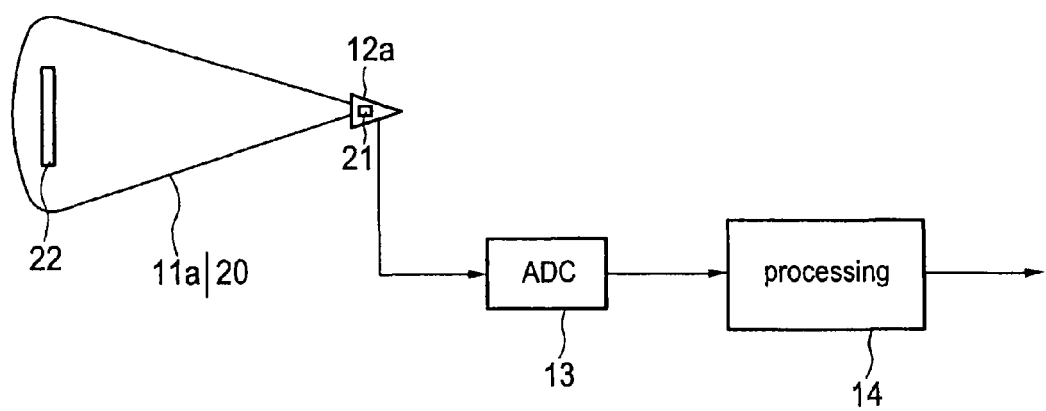
FIG. 2 shows a schematic diagram of the first embodiment of a sensor subsystem according to the present invention.
Figure 3:
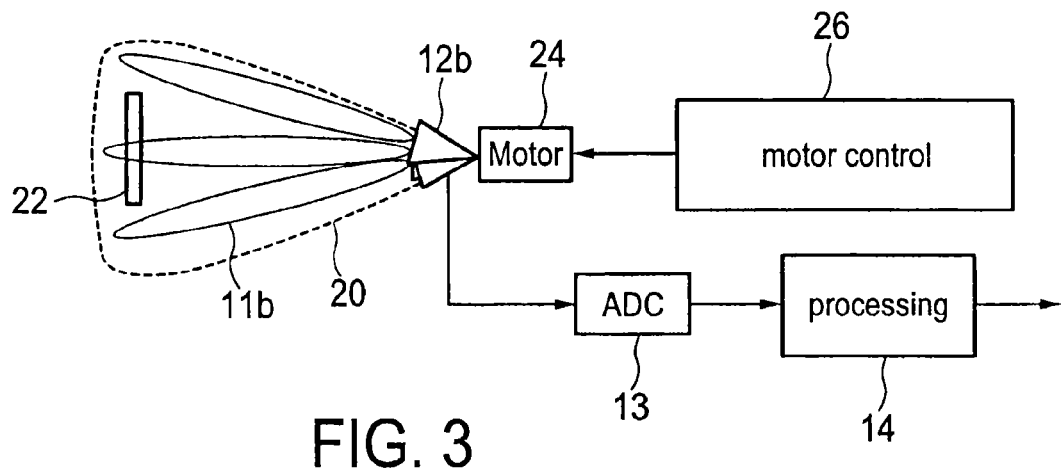
FIG. 3 shows a schematic diagram of a second embodiment of a sensor subsystem according to the present invention.
Figure 4:
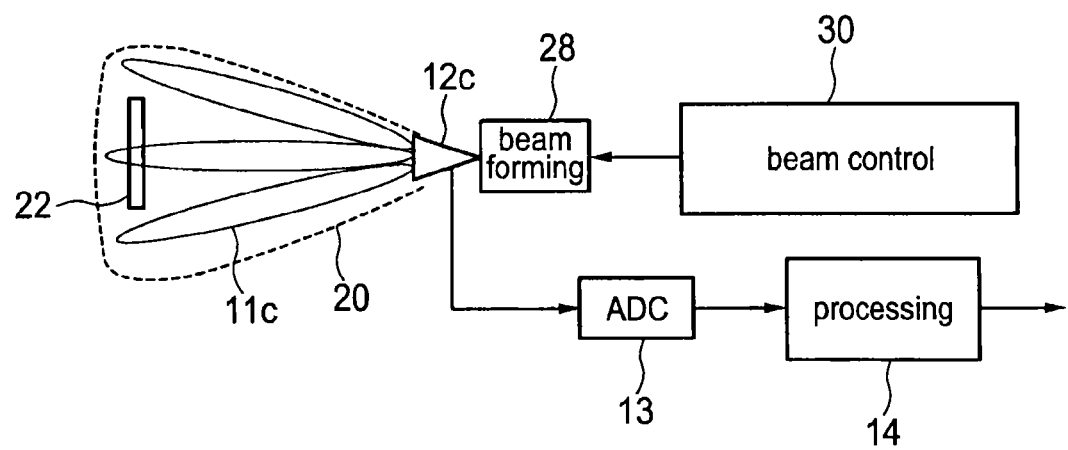
FIG. 4 shows a schematic diagram of the third embodiment of a sensor subsystem according to the present invention.

There are different possibilities for the implementation of the passive radiometer 12. One possible implementation is to use a single radiometric sensor (also referred to as radiometric unit) as shown in FIGS. 2 to 4.

There are also different possibilities when it comes to the question of how many spatially different measurements form the monitored area 20. At the one end of the scale, the radiometric sensor 12a is adapted for detecting radiation from the complete monitored area by a single measurement, i.e. one take by a single radiometric sensor 12a, as shown in FIG. 2, thus covering the entire monitored area 20. In this case persons can be distinguished (by the detection subsystem 14) from e.g. pets by the amount of radiation the single pixel sensor measures over time. In general, the single radiometer 12a shown in FIG. 2 comprises an antenna 21 (schematically shown) with a broad antenna pattern (e.g. a broad reception beam, or broad sensitivity profile) 11a, in which radiation is detected and which corresponds to the monitoring area 20. In this embodiment the radiometric sensor 12a is fixed. After the detection the radiation signal is provided to the processor (detection subsystem) 14, preferably after digitization by an analog-to-digital (ADC) converter 13.

On the other end of the scale the radiometric sensor can measure a multitude of spatially different measurements. This can be established, for instance, by employing means for mechanically and/or electrically moving the single radiometric sensor. An embodiment where the single radiometric sensor 12b is mechanically moved is shown in FIG. 3. In this embodiment the single radiometric sensor 12b comprises an antenna with a sharp antenna pattern 11b, which defines the size of a pixel, by which radiation is detected from the monitored area 20, which substantially corresponds to the envelope of the area over which the antenna pattern 11b is moved. The radiometric sensor 12b including the antenna is attached to a motor 24 which represents radiometer movement means. Said motor 24 can move the radiometer sensor 12b, in particular its antenna, in elevation and/or azimuth directions to effect a movement of the antenna pattern 11b over the monitored area 20 (which may generally be a movement in 1D or 2D, since—depending on the particular application—a 1D or 2D image may be desired). The motor is controlled by a motor controller 26. In this way the complete monitored area 20 (or a desired field of view thereof) is scanned in one or two dimensions.

In this case persons can be distinguished (by the detection subsystem 14) from e.g. pets by the number of pixels in the monitored area 20 that have the measurement signature of a person. Also, in case of being able to measure spatially different locations, the system might either support the feature of monitoring also some area next to the monitored area 20, thus e.g. stating that a person has wandered outside the monitored area 20 (in contrast to stating that the person is not in the monitored area any more). Further, a multitude of monitored areas might be monitored in parallel by such a single radiometric sensor 12b.

An embodiment where the antenna pattern 11c of the single radiometric sensor 12c is electronically moved is shown in FIG. 4. For this purpose electronic spot movement means 28 are provided. Said electronic spot movement means 28 are, for instance, implemented by an electronic beam positioning means or an electronic beam forming means. An example of such a digital beam forming means is described by N. A. Salmon et al. in "Digital Beam-Forming for Passive Millimeter Wave Security Imaging" in Antennas and Propagation, 2007, EuCAP 2007, November 2007 pp. 1-11. These electronic spot movement means 28 are controlled by a beam control unit 30.

Figure 5:
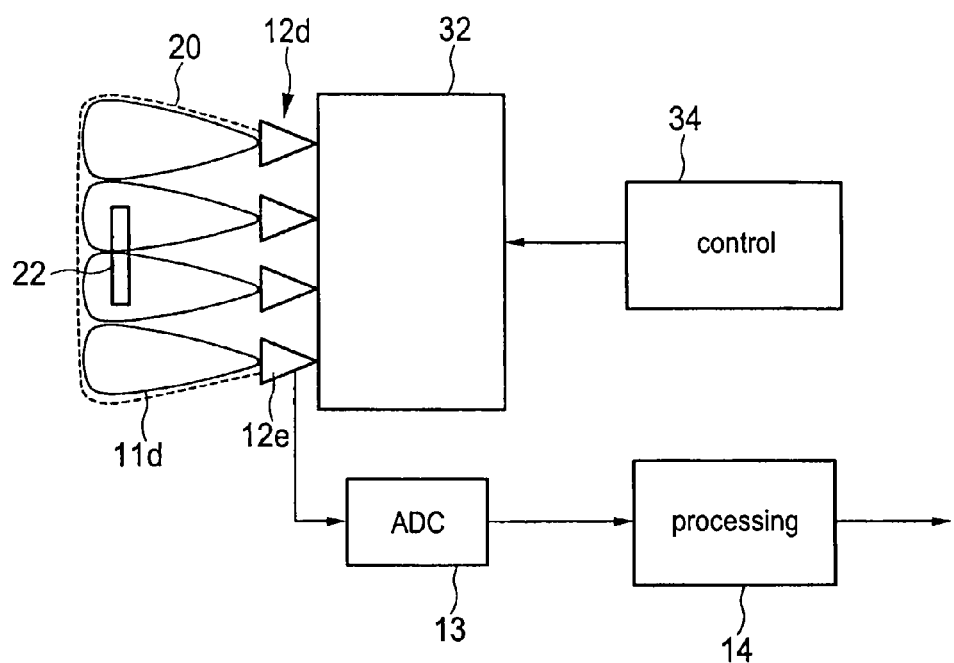
FIG. 5 shows a schematic diagram of a fourth embodiment of a sensor subsystem according to the present invention.

Still another embodiment is schematically shown in FIG. 5. In this embodiment a multi-pixel radiometric sensor unit 12d, i.e. comprising a plurality (at least two) of radiometric sensors 12e each having a sharp antenna pattern 11d. It can also be applied to a device 10c employing a radiometer 12c comprising multiple radiometer units 13 in a line or array distribution, as schematically depicted as an embodiment in FIG. 5. The spots of the individual radiometer units 12e are moved by the spot movement means 32 under control of a controller 34, wherein the antenna patterns 11d can either be individually (e.g. differently) moved, or can be simultaneously and identically moved. Hence, with such an embodiment measurement time can be saved compared to an embodiment having only a single radiometric sensor.

In order to make the monitored area visible for the person installing the system it is advantageous to use e.g. a light that covers the monitored area.

Referring again to FIG. 1, the detection subsystem (radiation signal processor) 14 receives the radiation signals from the sensor subsystem 12 and decides whether there is a person inside the monitored area 20 or not. The detection subsystem 14 either sends its decision, e.g. in the form of a monitoring signal generated by the detection subsystem 14 indicating the decision, to the application logic subsystem (application controller) 16 after having made a decision or as soon as this decision differs from the previous decision, i.e. upon a stated change of the "presence state" (indication if a person is present or not) in the monitored area 20.

To that end the detection subsystem 14 employs in an embodiment a threshold value for the amount of radiation a single pixel radiometric sensor (e.g. the sensor 12a shown in FIG. 2) measures over time. In particular, the detection subsystem 14 is adapted to generate said monitoring signal based on a comparison between said radiation signal, generated from radiation detected over a predetermined time, and said threshold signal. Said threshold may, for instance, be determined when the system is installed and adapted to the particular application and the monitored area, e.g. in a calibration procedure, so that the presence or absence of a person in the monitored area can be reliably detected without resulting in any or at least too many false detections.

In another embodiment the detection subsystem 14 employs a threshold value for the number of pixels that measure some radiation in case of multi-pixel radiometric sensors (e.g. the sensor 12d shown in FIG. 5 or the scanning sensors 12b, 12c shown in FIGS. 3 and 4). Also in this embodiment, the detection subsystem 14 is adapted to generate said monitoring signal based on a comparison between said radiation signal, generated from radiation detected over a predetermined time, and said threshold signal. In this case, however, the threshold signal indicates the number of radiometric sensors (or radiometer units) or pixels that detect radiation emitted from a person with the monitored area 20. For instance, if—in case a person is present in the monitored area—for 20 pixels radiation is detected above a certain limit (indicating radiation from a person and not from the background), and this number drops below a predetermined threshold number (e.g. 5), this is interpreted that the person has left the monitored area. Hence, in such an embodiment the monitoring signal is determined from a plurality of radiation signals, which additionally compensates for measurement glitches by using a number of measurements instead of just one.

The application logic subsystem (application controller) 16 gets, through the monitoring signal, either the timely decisions of the detection subsystem 14 of whether the monitored area 20 contains a person or not or a notification in case the state changes from "person in monitored area" to "no person in monitored area" or vice versa. The application logic subsystem 16 now decides how to react depending on the concrete application that is currently executed. Examples for such applications are fall notification application, wandering notification application, or night light application, which will be described below in more detail.

Preferably, at one point the application logic subsystem 16 will decide that some external device needs to be used. For that purpose the application logic subsystem 16 is preferably provided with an external interface 18. The external interface 18 connects the system to external devices such as e.g. a lamp 40, a bell 42, or a wireless sender 44. The type of external device to be connected to the external interface 18 depends on the concrete application.

A fall notification application is directed to persons (e.g. patients in a hospital), who are considered immobile. Every out-of-bed event is therefore considered a potential emergency (i.e. the patient might have fallen out of the bed). Therefore, every out-of-bed event leads to a notification of responsible personal through one of more devices connected to the external interface 18. Such devices can be bells, pagers, and the like. The system preferably remains in an emergency mode until it is manually set to normal operation in order to have the responsible personal have confirmed that the emergency situation is over.

A wandering notification application is directed to dementia-affected persons or smaller children, who might not be able to orientate themselves when going out-of-bed during the night so it might be desirable that some responsible person is informed as soon as this happens using similar devices as in the fall notification application. However, in contrast to the latter, the system goes back to normal mode automatically after again a person-in-bed event has been detected.

Figure 6:
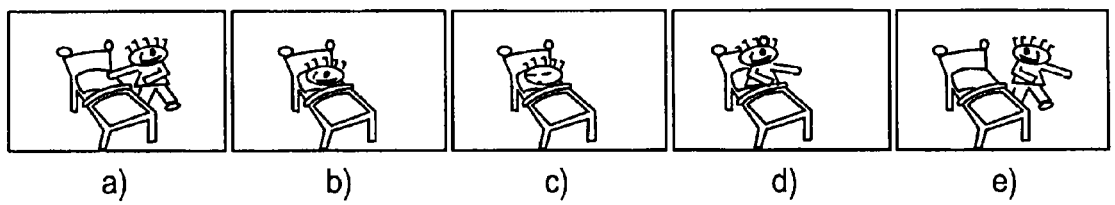
FIG. 6 shows a diagram illustrating an application of the system according to the present invention.

A night light application (illustrated in FIG. 6) is directed to children, who might need light in order to fall asleep. When in bed, the light should be switched off after some time (advantageously after the child had fallen asleep; see FIGS. 6 b) and c)). When the child leaves the bed the light should be switched on again (see Figs. d) and e)) in order to allow the child to fight its fears and then the cycle of switching off the light again should be restarted.

It should be noted that for this application, the signals from the sensor subsystem might in addition be used in a different manner than just an in bed/out of bed decision. The question of whether a person has fallen asleep might be approximately answered using the measured radiation from one or more pixels. In case a person is awake some level of movement can be expected that might result in a certain fluctuation in the used radiation. When this person is asleep likely the movements are much smaller thus resulting in lesser fluctuation of the radiation that can be measured by the sensor subsystem.

Obviously, this application requires a light to be the external device to connect to. Hence, in particular for this application, the system, in particular the sensor subsystem 12, could be integrated with the light unit in a single device, for instance within a luminaire or lamp, preferably with a light bulb or a unit that can be put in a standardized light bulb screw base.

In summary, the present invention provides a system and a method for reliably monitoring the presence of a person in a monitored area. The proposed system and method can also be applied when the person is covered by clothes or a blanket or when the monitored area is lying in the dark. Compared to other known systems the number of false alarms can be kept low, in particular after an appropriate calibration of the system. Still further, no additional hardware needs to be attached to the elements, e.g. a bed, within the monitored area so that the system can be generally used for various applications and in various situations, e.g. can be simply moved from a first monitored area to another monitored area, or simply another bed with another person can be moved into the monitored area, as will be often the case in a hospital.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A system for monitoring the presence of a subject in a monitored area, comprising:
    a passive radiometric sensor that detects radiation emitted from a subject in a predetermined monitored area in a predetermined frequency range between 1 GHz and 100 THz and that generates a radiation signal from the detected radiation,
    a radiation signal processor that processes said radiation signal to determine whether the subject is present in the predetermined monitored area and that generates, based on said processed radiation signal, a monitoring signal indicating the presence or absence of the subject in said monitored area, and
    an application controller that controls an application to provide a predetermined response when said monitoring signal indicates that the subject is not present,
    wherein said radiation signal processor generates said monitoring signal based on a comparison between said radiation signal, generated from an amount of radiation detected over a predetermined time, and a threshold determined at least during installation of the system.

2. The system according to claim 1, wherein the passive radiometric sensor comprises a line or an array of radiometers that detect radiation and that have a form of a line or array.

3. The system according to claim 1, further comprising a mechanic radiometer movement unit that effects a relative movement of the passive radiometric sensor with respect to the monitored area for scanning said monitored area.

4. The system according to claim 1, further comprising an electronic beam positioner that effects an electronic movement of a sensitivity profile of said passive radiometric sensor to scan said monitored area.

5. The system according to claim 1, wherein said radiation signal processor is configured to generate said monitoring signal based on a comparison between said radiation signal, generated from radiation detected over a predetermined time, and a threshold signal.

6. The system according to claim 5, wherein said threshold signals indicate a predetermined amount of radiation a radiometer detects over time.

7. The system according to claim 5, wherein said threshold signal is a number of radiometer units and/or pixels, at which radiation emitted from the subject within said monitored area is detected.

8. The system according to claim 7, wherein the radiation signal processor determines whether the subject is a human or an animal based on the number of radiometer units and/or pixels detected.

9. The system according to claim 1, wherein said radiation signal processor is configured to generate said monitoring signal from a plurality of radiation signals.

10. The system according to claim 1, further comprising:
    an application interface to which external devices carrying out said application can be coupled and through which said external devices can be controlled by said application controller.

11. The system according to claim 1, wherein said passive radiometric sensor is integrated within a luminaire or lamp, within a light bulb.

12. The system according to claim 1, wherein the predetermined monitored area is a bed.

13. The system according to claim 1, wherein the predetermined response includes sending a wireless notification to a mobile device.

14. The system according to claim 1, wherein the predetermined response includes an audible or visual notification.

15. The system according to claim 14, wherein the audible notification includes ringing of a bell and the visual notification includes turning on of a lamp.

16. The system according to claim 1, wherein the lamp is turned off when the subject is in the monitored area for a predetermined amount of time.

17. A method for causing a system to monitor presence of a subject in a monitored area, comprising:

detecting, with a passive radiometric sensor, radiation emitted from a subject in a predetermined monitored area in a predetermined frequency range between 1 GHz and 100 THz;

generating a radiation signal from the detected radiation;

processing, with a radiation processor, said radiation signal to determine whether the subject is present in the predetermined monitored area and generating, based on a comparison between said radiation signal, generated from an amount of radiation detected over a predetermined time, and threshold signals, a monitoring signal indicating the presence or absence of the subject in the monitored area, the threshold signals being determined at least during installation of the system, and controlling, with an application processor, an application to provide a predetermined response when said monitoring signal indicates that the subject is not present in the monitored area.

18. A non-transitory computer-readable medium encoded with computer-readable instructions thereon that, when executed by a computer cause the computer to perform a method according to claim 17.

\* \* \* \* \*